United States Patent
Shelby et al.

[11] Patent Number: 5,980,797
[45] Date of Patent: Nov. 9, 1999

[54] APPARATUS AND METHOD FOR MOLDING POLYESTER ARTICLES HAVING LOW ACETALDEHYDE CONTENT DIRECTLY FROM THE MELT FORMATION USING FLASH TANK DEVOLTATILIZATION

[75] Inventors: Marcus David Shelby; Lanney Calvin Treece; Max Lamar Carroll, Jr.; Stephen Weinhold, all of Kingsport, Tenn.

[73] Assignee: Eastman Chemical Company, Kingsport, Tenn.

[21] Appl. No.: 08/957,522

[22] Filed: Oct. 24, 1997

Related U.S. Application Data

[60] Provisional application No. 60/041,056, Mar. 20, 1997.

[51] Int. Cl.[6] .......................... B29C 47/38; B29C 47/50; B29C 47/76
[52] U.S. Cl. .............................. 264/85; 159/2.2; 264/102; 264/211.21; 264/211.23; 425/203; 425/204; 425/207; 425/209; 528/483; 528/492; 528/501
[58] Field of Search ....................... 264/85, 102, 211.21, 264/211.23; 425/203, 204, 207, 209; 159/2.2; 528/483, 492, 501

[56] References Cited

U.S. PATENT DOCUMENTS

| | | |
|---|---|---|
| 3,050,533 | 8/1962 | Munro et al. . |
| 3,458,494 | 7/1969 | Scoggin . |
| 3,470,070 | 9/1969 | Heckart . |
| 3,476,736 | 11/1969 | Kabre . |
| 3,989,677 | 11/1976 | Brassat et al. . |
| 4,294,652 | 10/1981 | Newman . |
| 4,728,701 | 3/1988 | Jarvis et al. . |
| 4,734,243 | 3/1988 | Kohama et al. . |
| 5,350,813 | 9/1994 | Skilbeck . |
| 5,380,822 | 1/1995 | Skilbeck . |
| 5,543,495 | 8/1996 | Anolick et al. . |
| 5,597,891 | 1/1997 | Nelson et al. . |
| 5,648,032 | 7/1997 | Nelson et al. .......................... 264/101 |
| 5,656,221 | 8/1997 | Schumann et al. . |
| 5,656,719 | 8/1997 | Stibal et al. . |

FOREIGN PATENT DOCUMENTS

| | | |
|---|---|---|
| 525 748 A1 | 3/1993 | European Pat. Off. . |
| 195 05 680 | 5/1996 | Germany . |
| 195 03 053 | 8/1996 | Germany . |

OTHER PUBLICATIONS

Johnson, John M. (Popular Plastics and Packaging, Apr. 1994, p. 59).
Mack, M. H. et al (Proceedings of ANTEC '93, SPE, p. 1060).
Meister, B. J., et al (Ind. Eng. Chem. Res 28, 1989, p. 1659).
Translation of Japan 7–164509 (Published Jun. 27,1995).

*Primary Examiner*—Leo B. Tentoni
*Attorney, Agent, or Firm*—Karen A. Harding, Esquire; Harry J. Gwinnell, Esquire

[57] ABSTRACT

An apparatus and a method for molding of polyester articles having low acetaldehyde content directly from a melt without intermediate solidification of the molten polyester. A melt to mold process is used wherein an acetaldehyde stripping agent is mixed into a polyester melt before devolatilization in a flash tank. The devolatilized polyester is pumped out of the flash tank and injected into a mold, thus forming a shaped article. The apparatus may include one or more flash tanks in one devolatilization line, or multiple devolatilization lines may be used stemming from one main polymerization reactor. The final shaped article should contain less than 10 ppm of acetaldehyde.

20 Claims, 3 Drawing Sheets

APPARATUS AND METHOD FOR MOLDING POLYESTER ARTICLES HAVING LOW ACETALDEHYDE CONTENT DIRECTLY FROM THE MELT FORMATION USING FLASH TANK DEVOLTATILIZATION

RELATED APPLICATION

This application claims priority of provisional application Ser. No. 60/041,056 filed Mar. 20, 1997.

FIELD OF THE INVENTION

The present invention relates to an apparatus and a method for molding polyester articles. More particularly, the invention relates to an apparatus and a method for molding polyester articles having low acetaldehyde content using flash tank devolatilization.

BACKGROUND OF THE INVENTION

Polyesters are widely used in the manufacture of fibers, molded objects, films, sheeting, food trays, and food and beverage containers. These polymers are generally made by melt phase polymerization reactions which are well known in the art. It is common practice in the art to pelletize the generated polyester for subsequent extrusion or molding operations which require remelting of the pelletized polyester. However, during the processing of polyesters in the melt phase, certain undesirable by-products are formed. One such by-product is acetaldehyde which is continually formed as a by-product during the polymerization and subsequent melt processing of polyesters. Acetaldehyde is known to contaminate food or beverage products when it is present in a food or beverage container. Therefore, it is desirable to produce molded polyester containers having an acetaldehyde content at a low or zero level.

A three stage process has been generally used to produce polyester polymers. This process typically involves the preparation of a low molecular weight polyester precursor by melt phase polymerization techniques that are well known in the art. This precursor is then pelletized and solid-state polymerized. Typically during the solid-state polymerization, an inert gas is used to strip acetaldehyde and other by-product from the pellets, producing pellets with a low acetaldehyde of about 1 ppm or less. However, when the pellets are remelted and formed into a molded product, the acetaldehyde content in the polyester increases to an undesirable level of from about 8 ppm to about 10 ppm or more. Therefore, a more efficient method of producing a polyester article with low acetaldehyde content has been desired.

U.S. Pat. No. 5,597,891 describes an improved process for lowering the acetaldehyde content of molten polyethylene terephthalate (PET) to levels suitable for direct use in food packaging articles by mixing an inert gas with the molten polyester. In this process, devolatilization occurs through venting of a continuous screw conveyor, such as a single or multi-screw extruder. U.S. Pat. No. 4,734,243 describes an injection molding machine for plastics provided with a plasticization device which consecutively plasticizes material and feeds a plurality of injection devices in sequence. German Patent DE 19505680 and U.S. Pat. No. 5,656,221 describe a process for the production of bottle preforms from a melt whereby an inert gas is admitted into the continuous flow of the polyester melt. In this process, devolatilization occurs in a vented extruder. U.S. Pat. No. 5,656,719 describes the direct production of molded packages that imparts no taste from thermoplastic polyesters. An inert gas is dispersed into the polyester by means of stationary pipeline mixers, and the polyester is degassed in an enlarged pipe segment under vacuum.

Japanese Application Hei 5-315154 describes a method and apparatus for water injection, dispersion, bubbling, and degassing whereby volatiles present in the said polymer are vaporized and removed. European Patent 0525748A1 describes a method and apparatus for removal of hydrocarbons from polymer slurries. U.S. Pat. No. 3,470,070 describes a similar procedure wherein hexane is removed from hydrogenated polybutadiene. U.S. Pat. No. 3,458,494 describes a flash tank apparatus for removing cyclohexane from polyethylene. The effluent is flashed through a nozzle into the flash tank at which point it contacts heat exchanger plates and the solvent evaporates. U.S. Pat. No. 3,476,736 describes solvent recovery in polyolefins via a vented extruder. U.S. Pat. Nos. 5,380,822 and 5,350,813 describe processes for removing residual monomer in polymers by injecting water or a suitable, condensable fluid into the melt and passing the effluent through a flash tank. U.S. Pat. No. 5,543,495 describes a process whereby an inert gas is injected into a condensation polymer melt at elevated temperature. U.S. Pat. No. 3,989,677 describes an improved process for the production of polyamides by treating the melt with water or steam and devolatilizing in a vented extruder. U.S. Pat. No. 4,728,701 describes the use of flash tank devolatilization for the removal of solvent and monomer from acrylate polymers after polymerization. U.S. Pat. No. 4,294,652 describes an improved devolatilizer using multiple tanks or stages.

Johnson, John M. (Popular Plastics and Packaging, April 1994, p.59) discusses various means for devolatilization including vented extruders and flash tanks. This method is applied to the processing of pelletized polymer rather than a melt to mold process wherein a polyester is polymerized and then devolatilized directly from the melt, before being molded into a desired shape. Mack, M. H. et al (Proceedings of ANTEC '93, SPE, p. 1060) describe the effect of various stripping agents on the removal of residual hydrocarbon in LDPE using a vented single-screw extruder. Meister, B. J., et al (Ind. Eng. Chem. Res 28, 1989, p.1659) disclose the devolatilization performance of a flash tank in a commercial polystyrene line. No stripping agent was taught.

The present invention provides an improved apparatus and a method of forming polyesters articles having a low acetaldehyde content. In the practice of the present invention, molten polyester is prepared by continuously reacting polyester precursors and injecting an acetaldehyde stripping agent which is inert to the polyester into the melt under pressure. The polyester is then devolatilized in a flash tank under vacuum and molded directly from the melt into shaped articles. The apparatus and method of the present invention avoids the costly steps of reprocessing pelletized polyester, and forms articles with superior qualities such as better color, enhanced molecular weight, and fewer physical defects, as well as having a low acetaldehyde content.

SUMMARY OF THE INVENTION

The invention provides an apparatus for producing molded thermoplastic articles comprising:
a) means for reacting polyester precursors and forming a molten polyester homopolymer or copolymer;
b) means for flowing the molten polyester into a mixer, without intermediate solidification of the molten polyester; means for injecting an acetaldehyde stripping agent into the mixer; said mixer being capable of forming a mixture of the molten polyester and the acetaldehyde stripping agent under superatmospheric pressure;

c) means for flowing the mixture through one or more dies into an upper portion of a flash tank maintained under vacuum conditions therein, said dies being capable of imparting a back pressure to the mixer; means for removing vented gases, vapors and acetaldehyde from the flash tank; and d) means for removing collected devolatilized polyester from the flash tank and injecting the devolatilized polyester into a molding apparatus.

The invention also provides a method for producing molded polyester articles comprising:

a) reacting polyester precursors and forming a molten polyester homopolymer or copolymer;

b) continuously flowing the molten polyester from step (a) into a mixer, without intermediate solidification of the molten polyester, and forming a mixture of the polyester and an acetaldehyde stripping agent by injecting the acetaldehyde stripping agent into the mixer and mixing the stripping agent with the molten resin under superatmospheric pressure;

c) flowing the mixture, through one or more dies, into an upper portion of a flash tank maintained under vacuum conditions therein, which dies impart a back pressure to the mixer, while removing vented gases, vapors and acetaldehyde from the tank; and d) removing collected devolatilized polyester from the tank and injecting the devolatilized polyester into a molding apparatus.

DETAILED DESCRIPTION OF THE PREFERRED EMBODIMENT

Figure 1:
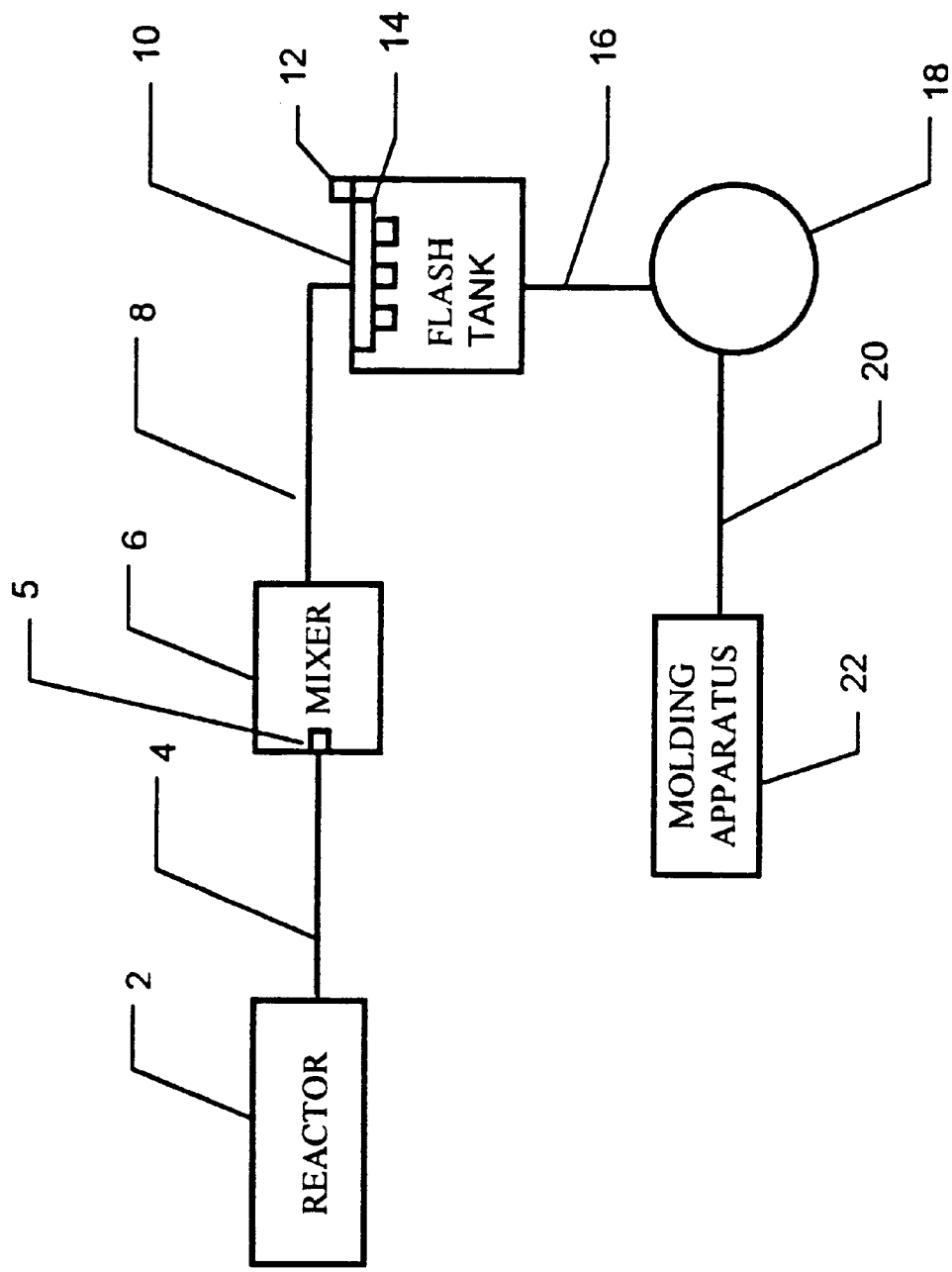
FIG. 1 shows a schematic representation of the process of the present invention.

The invention provides an apparatus and a method to remove acetaldehyde from molten polyester polymers using flash tank devolatilization, optionally followed by direct molding to form articles containing less than about 10 ppm of acetaldehyde.

The process of the invention involves the known initial steps of polyester formation by esterification of at least one dicarboxylic acid with at least one glycol, followed by polycondensation to form high molecular weight polyester; and subsequently forming the polyester into shaped articles. The polyester polymers are prepared from monomers in a melt-phase and fed directly to at least one molding or other shaping machine without solidifying the polyester prior to entry into the molding machine.

In the practice of the present invention, a polyester composition is prepared which may be produced by condensing a dibasic acid, such as a dicarboxylic acid or a lower alkyl diester thereof with a glycol. Among the dicarboxylic acids and their lower alkyl diesters which may be employed to form a polyester are terephthalic; isophthalic; phthalic; naphthalene dicarboxylic; succinic; sebacic; adipic; azelaic; bibenzoic; the hexahydrophthalics, and bis-p-carboxyphenoxyethane. Highly useful naphthalene dicarboxylic acids include the 2,6-, 1,4 -, 1,5-, or 2,7-isomers but the 1,2-, 1,3-, 1,6-, 1,7-, 1,8-, 2,3-, 2,4-, 2,5-, and/or 2,8-isomers may also be used. Dibasic acids may contain from about 2 to about 40 carbon atoms and include isophthalic, adipic, glutaric, azelaic, sebacic, fumaric, dimer, cis- or trans-1,4-cyclohexanedicarboxylic, the various isomers of naphthalenedicarboxylic acids and the like. Preferred dibasic acids include terephthalic acid, isophthalic acid, naphthalene dicarboxylic acid, cyclohexane dicarboxylic acid and mixtures thereof. The dibasic acids may be used in acid form, acid anhydride form or as their esters such as the dimethyl esters. One or more of these acids and/or their lower alkyl diesters is reacted with one of more glycols which include glycols having from about 3 to about 10 carbon atoms and include ethylene glycol, propylene glycol, 1,3-propanediol, 1,4-butanediol, 1,6-hexanediol, diethylene glycol, 1,4-cyclohexanediol, 1,4-cyclohexanedimethanol, neopentyl glycol and the like. The 1,4-cyclohexanedimethanol may be in the cis or the trans form or as cis/trans mixtures. Preferred glycols include ethylene glycol, 1,4-cyclohexane dimethanol diethylene glycol and mixtures thereof. Since one or more diesters may be reacted with one or more glycols, the polyester film of this invention is not limited to homopolyesters but also includes mixed polyesters such as copolyesters as well as copolymers with other monomers.

Polymers that are particularly useful in this process include poly(ethylene terephthalate), poly(ethylene naphthalenedicarboxylate), and copolyesters containing up to about 50 mole % of modifying dibasic acids and/or glycols. Of the polyesters within the contemplation of this invention, preferred are those containing at least a major amount of polyethylene terephthalate, the most preferred being completely polyethylene terephthalate. Polyethylene terephthalate is formed from a polymer produced by the polymerization of bis-(2-hydroxyethyl) terephthalate which is itself formed as an intermediate by one of two different methods. One method for producing bis-(2-hydroxyethyl) terephthalate is by direct esterification of terephthalic acid with ethylene glycol as described in U.S. Pat. No. 3,050,533. In this method the by-product of the reaction is water which is distilled from the reaction product. A second method for producing bis-(2-hydroxyethyl) terephthalate is by transesterification of dialkyl ester of terephthalic acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. For example, a temperature in the range of from about the boiling temperature of the reaction mixture to as high as about 250° C. may be used. The reaction can occur at atmospheric, sub-atmospheric or super-atmospheric pressure. A by-product of the transesterification reaction is an alkanol. For example, if dimethyl terephthalate is used, methanol is produced. The alkanol is then removed from the reaction product.

In order to increase the reaction rate, many known catalysts may be employed in the transesterification reaction. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present from the beginning of the reaction, or may be added at any convenient point in the process.

After the intermediate bis-(2-hydroxyethyl) terephthalate has been produced, it may be converted to polyethylene terephthalate by heating at a temperature above the boiling point of the ethylene glycol or the reaction mixture under conditions effecting the removal of the glycol or water. The heating may occur at a temperature as high as 325° C., if desired. During heating, pressure is reduced so as to provide rapid distillation of the excess glycol or water. The final polyethylene terephthalate polymer may have an intrinsic viscosity, as measured in orthochlorophenol at 25° C., in excess of 0.3 deciliter per gram. More preferably, the intrinsic viscosity of the polymer ranges from about 0.4 to about 1.0 deciliter per gram, measured in orthochlorophenol at 25° C. Still more preferably, the polyethylene terephthalate employed in the present invention has an intrinsic viscosity of about 0.5 to about 0.7 deciliter per gram as measured in orthochlorophenol at 25° C. The thermoplastic polyester containing polymers of this invention have a preferred melting point in the range of from about 200° C. to about 330° C. or more preferably from about 220° C. to about 290° C. and most preferably from about 250° C. to about 275° C.

Suitable for use as comonomers in polyester copolymers are such components as ethers, esters and partial esters of acrylic and methacrylic acid and of aromatic and aliphatic polyols. The production of such copolymers is well known in the art.

Many different kinds of additives can also be added into the melt, depending on the nature of the desired properties in the finished article. Such additives may include, but are not limited to, colorants, anti-oxidants, acetaldehyde reducing agents, stabilizers, e.g. uv and heat stabilizers, impact modifiers, polymerization catalyst deactivators, melt-strength enhancers, chain extenders, antistatic agents, lubricants, nucleating agents, solvents, fillers, plasticizers and the like.

Referring to FIG. 1, polyester homopolymer or copolymer precursors are first polymerized in a reactor 2. After polymerization, the molten polyester flows via a conduit 4 into a mixer 6 without intermediate solidification of the molten polyester, and generally has an inherent viscosity (IhV) generally ranging from about 0.5 to about 1.0, with a more preferred range of from about 0.7 to about 0.9. As used herein, the term "IhV" refers to inherent viscosity of the polymer as determined by a solution of 0.5 gram of polymer dissolved in 100 ml of a mixture of phenol (60% by volume) and tetrachloroethane (40% by volume). The mixer 6 is capable of forming mixtures of the molten polyester and an acetaldehyde stripping agent under superatmospheric pressure. Suitable mixers include a static mixer, a gear pump, a single or multi-screw extruder, all of which are well known in the art. An acetaldehyde stripping agent is injected into the mixer 6 by an injection nozzle 5 at a rate of about 1.0 SCF/lb of the polymer or less. The activity of the mixer forms a multitude of small gas bubbles in the molten polyester. The acetaldehyde and other by-products present in the polyester diffuse into the gas. Suitable stripping agents which are inert to the polyester include nitrogen, carbon dioxide, $C_1$ to $C_4$ hydrocarbons, dehumidified air, and the noble gases. The more preferred stripping agents are carbon dioxide and nitrogen. Throughout the process, the molten polyester is maintained at a temperature greater than the melting point of the polymer, but preferably no greater than from about 10° C. to about 15° C. higher than its melting point. The preferred temperature of the polyester ranges from about 255° C. to about 290° C.

At this point, the polyester-stripping agent mixture flows into a flash tank 10 for devolatilization therein. Devolatilization is conducted under vacuum conditions to remove acetaldehyde, gases, vapors, and other volatile components from the molten polyester. The pressure reduction creates a melt foam under such conditions of reduced pressure. The vacuum maintained in the flash tank 10 ranges from about 5 mm Hg to about 50 mm Hg. The mixture flows from the mixer to the flash tank through conduit 8 into an upper portion of the flash tank 10 through one or more dies 14 which impart a back pressure to the mixer 6. The dies 14 can optionally be arranged in a manifold configuration as shown in FIG. 1. The back pressure from the dies 14 is at a level sufficient to keep the stripping agent within the mixer, and ranges from about 1,000 psi to about 3,000 psi. The dies 14 extrude the polyester-stripping agent mixture into multiple strands, filaments or ribbons which foam vigorously as they fall to the bottom of the flash tank 10. The foaming of the mixture occurs due to the great pressure differential between the vacuum in the flash tank 10 and the entrained gas within the polyester. The dies 14 extrude the mixture to maximize the surface area of the mixture so that the volatiles can escape more readily from the polyester as the mixture falls to the floor of the flash tank 10. As devolatilization progresses, any accumulated gas, vapor, or acetaldehyde within the flash tank 10 are released through a vent 12. The polymer is collected at the bottom of the flash tank and adequate residence time is allowed for the acetaldehyde stripping agent to be substantially completely removed. The residence time is dictated by the flow rate of the polymer and the time it takes for the polymer to fall from the die to the bottom of the tank. The most appropriate residence time can easily be determined by those skilled in the art.

Following devolatilization, the collected polyester is sent along line 16 to a pumping or injecting means 18, which may comprise an extractor screw, which draws the collected polyester from the bottom of flash tank 10. The polyester then flows from pumping or injecting means 18 along line 20 into molding apparatus 22 where it is molded into a shaped article. The pumping or injecting means 18 can be a ram accumulator, a gear pump, or an extruder. A gear pump has the advantage of relatively low shear and low residence time so additional acetaldehyde generation is minimized. Alternatively, a vented extruder could be used to pump the melt although residence times and acetaldehyde generation is increased. A vented extruder has the advantage of allowing one last devolatilization step, particularly if all of the stripping agent was not removed in the flash tank. If complete removal of the stripping agent is not required, but residual acetaldehyde is still present, then a second stripping agent can be added into the extruder to further enhance devolatilization. The compositions of the invention are useful for manufacturing shaped articles, such as structural parts by such processes as injection molding, gas-assist injection molding, blow molding, extrusion thermoforming and the like. The articles may also comprise articles suitable for the packaging of goods or pelletized polyester which may be packaged and sold. Molding may be generally done in apparatuses such as ram accumulators, or in a commercially available molding machine such as 150 ton Cincinnati molder. When utilizing ram accumulators, it is preferred that they be arranged in pairs. Upon filling of one of the rams, a valve is closed and the ram forces the molten polymer into the mold where it is cooled until solid, at which point it is ejected. While one accumulator ram in injecting polymer into the mold, the other is being filled from the melt stream. The accumulators alternate between being filled and then injecting polymer into the mold. The final concentration of acetaldehyde in the molded articles will preferably be less than about 5 ppm, and more preferably less than about 3 ppm.

Figure 3:
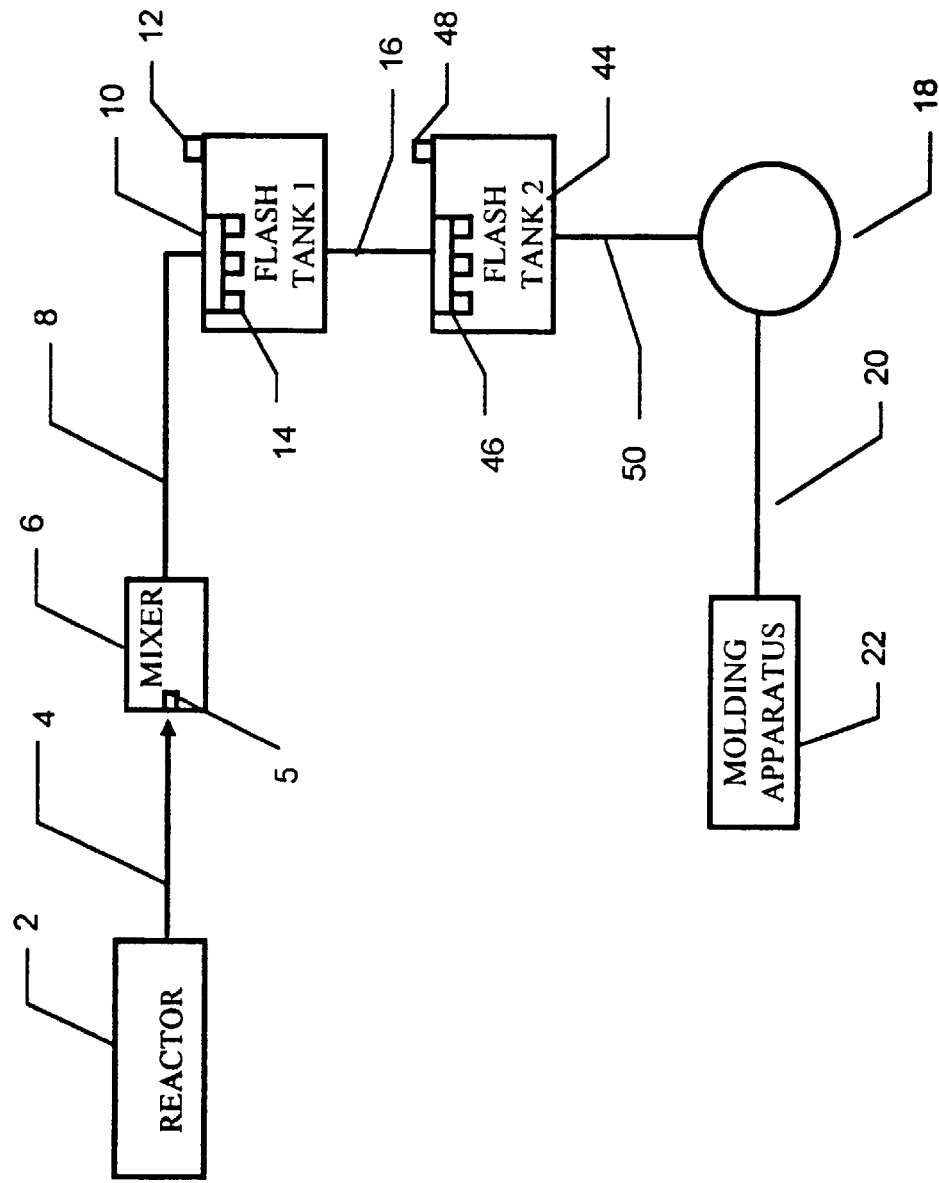
FIG. 3 shows a schematic representation of another embodiment of the invention wherein serial flash tanks are used.

FIG. 3 shows an alternative embodiment of the invention. Instead of continuously flowing directly from flash tank 10 to pumping or injecting means 18, the polyester may optionally flow into a second flash tank 44, maintained under the same vacuum conditions as the first flash tank, for additional devolatilization to further reduce the acetaldehyde content in the polyester. Pumping or injecting means 18 may comprises an extractor screw. In this embodiment, the polyester flows from flash tank 10, along line 16, which may comprises an extractor screw, and into an upper portion of flash tank 44 through one or more dies 46. The dies 46 may optionally be arranged in a manifold configuration as shown in FIG. 3. A pumping means or significant pressure difference in line 16 between the two flash tanks would generally be needed to move polymer between the two flash tanks. Also, it may be necessary to inject additional stripping agent at this point. Any gas, vapor, or acetaldehyde accumulated within the flash tank 44 are released through a vent 48. The polymer is collected at the bottom of the flash tank 44, and is then sent along line 50 to pumping or injecting means 18 which draws the collected polyester from the bottom of flash tank 44. The polyester then flows from pumping or injecting means 18 along line 20 into molding apparatus 22 where it is shaped into a preform, as mentioned above.

Figure 2:
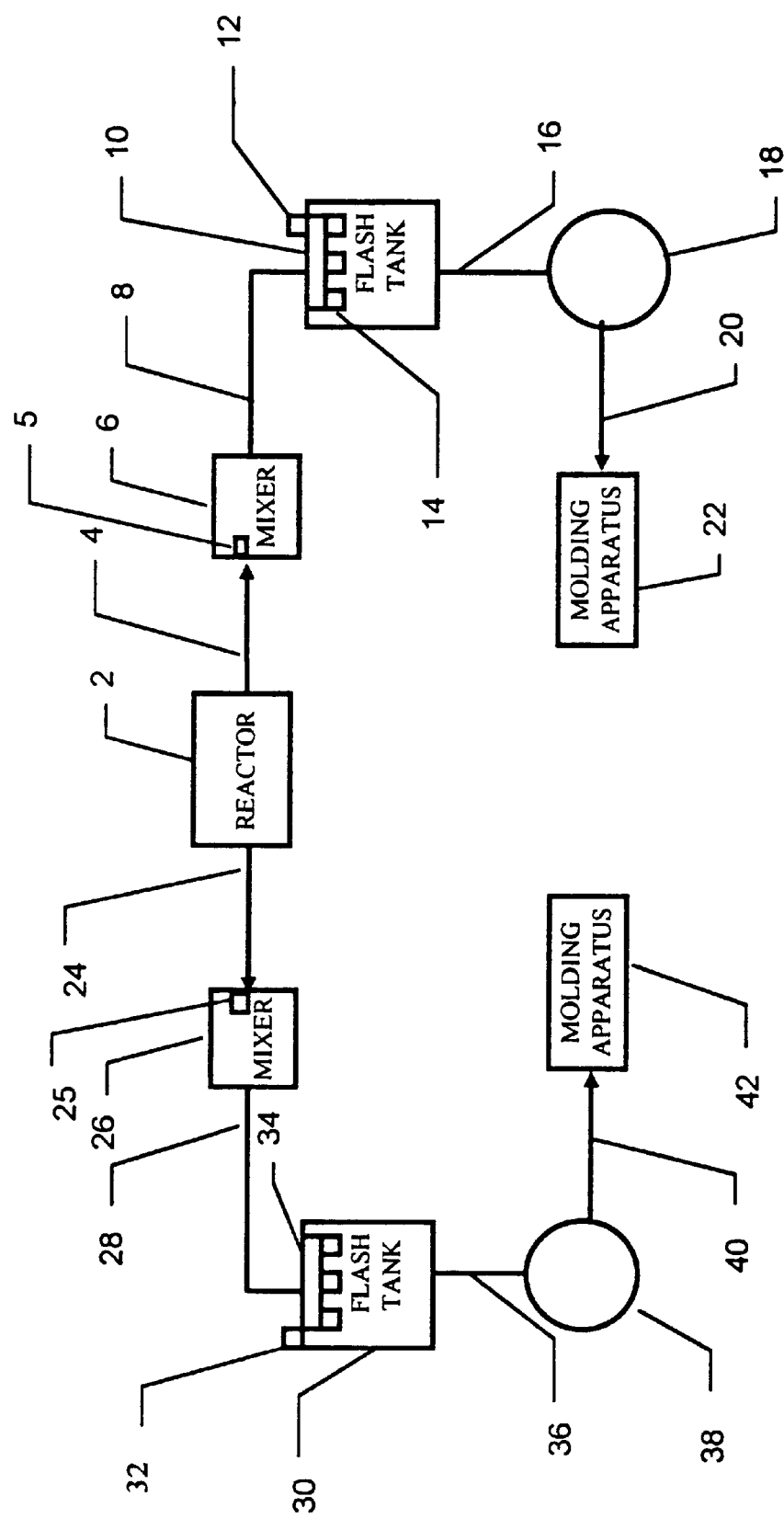
FIG. 2 shows a schematic representation of an alternative embodiment wherein more than one devolatilization line is used.

In another embodiment as shown in FIG. 2, after the polyester homopolymer or copolymer precursors are polymerized in reactor 2, the molten polyester may optionally flow into a plurality of mixers. Referring to FIG. 2, the molten polyester may be transported from reactor 2 along lines 4 and 24 to mixers 6 and 26, without intermediate solidification of the molten polyester. Upon reaching mixers 6 and 26, an acetaldehyde stripping agent is injected into the polyester by injection nozzles 5 and 25. The mixers 6 and 26 are capable of forming mixtures of the molten polyester and the acetaldehyde stripping agent under superatmospheric pressure. Once a polyester-stripping agent mixture is formed in mixers 6 and 26, the mixture flows along lines 8 and 28 into an upper portion of flash tanks 10 and 30, each maintained under vacuum conditions therein, through one or more dies 14 and 34. The dies 14 and 34 which impart a back pressure to mixer 6 and 26 may optionally be arranged in a manifold configuration. The dies 14 and 34 extrude the polyester into filaments or ribbons to increase the efficiency of devolatilization in the flash tanks 10 and 30. Any gas, vapor, or acetaldehyde accumulated within flash tanks 10 and 30 are released through a vents 12 and 32. The polyester is then collected at the bottom of the flash tanks 10 and 30, and sent along lines 16 and 36 to pumping or injecting means 18 and 38 which draw the collected polyester from the bottom of flash tanks 10 and 30. The polyester then flows from pumping or injecting means 18 and 38 along lines 20 and 40 into molding apparatuses 22 and 42 where it is shaped into a preform, as mentioned above.

The different devolatilization lines may have different additives such as colorants or pigments added to each mixer, while the polymer stems from a single polymerization reactor. In cases where additional reaction is required in a given devolatilization line, a twin screw extruder may be preferred as mixer 6 or 26 to incur additional polymerization time. In instances where a significant buildup of IhV is desired, long polymerization times and a very low vacuum are required, which may not be practical in a conventional extruder. Instead, a polymerization reactor would be required. The stripping agent used in this embodiment would be added through a port in the reactor, preferably near the end of the reactor.

Each optional devolatilization line may also produce a different copolymer, such as PET/PEN or PET/PCT, by adding the additional polymer component in the twin screw extruder mixer and allowing sufficient time for the level of transesterification desired. This additional polymer component may be fed into the twin screw extruder via a satellite extruder using pre-pelletized homopolymer or it may be pumped in from a separate polymerization reactor before or after flash tank devolatilization.

Prior to forming the polyester-stripping agent mixture, an acetaldehyde reducing agent may optionally be added to reduce the amount of acetaldehyde in the polyester. An acetaldehyde reducing agent may also be added to the devolatilized polyester after it is removed from the flash tank to further reduce amounts of acetaldehyde in the polyester prior to molding. It is important to keep the total amount of acetaldehyde reducer small so that excessive preform hazing does not occur. The preferred amount is less than about 0.5 lb additive per 100 lbs of polymer. Suitable acetaldehyde reducing agents include, but are not limited to, polyamides and polyesteramides. A mixing section designed to thoroughly mix the additive with the polymer should be provided. Residence time in this section should typically be less than about 20 seconds.

What is claimed is:

1. An apparatus for producing molded thermoplastic articles comprising:

a) means for reacting polyester precursors and forming a molten polyester homopolymer or copolymer;

b) means for flowing the molten polyester into a mixer, without intermediate solidification of the molten polyester; means for injecting an acetaldehyde stripping agent into the mixer; said mixer being capable of forming a mixture of the molten polyester and the acetaldehyde stripping agent under superatmospheric pressure;

c) means for flowing the mixture through one or more dies into an upper portion of a flash tank maintained under vacuum conditions therein, said dies being capable of imparting a back pressure to the mixer; means for removing vented gases, vapors and acetaldehyde from the flash tank; and d) means for removing collected devolatilized polyester from the flash tank and injecting the devolatilized polyester into a molding apparatus.

2. The apparatus of claim 1 wherein the mixer comprises a static mixer, a gear pump, a single screw extruder or a multi-screw extruder.

3. The apparatus of claim 1 wherein the means (d) comprises a ram accumulator, a gear pump or an extruder.

4. The apparatus of claim 1 wherein (c) comprises a plurality of dies arranged in a manifold configuration.

5. The apparatus of claim 1 comprising means for flowing the molten polyester from step (a) into a plurality of mixers, without intermediate solidification of the molten polyester; means for injecting an acetaldehyde stripping agent into the mixers; said mixers being capable of forming mixtures of the molten polyester and the acetaldehyde stripping agent under superatmospheric pressure;

d) means for flowing each of the mixtures through one or more dies into an upper portion of a plurality of flash tanks, each maintained under vacuum conditions therein, said dies being capable of imparting a back pressure to the mixers; means for removing vented gases, vapors and acetaldehyde from the flash tanks; and e) means for removing collected devolatilized polyester from the flash tanks and injecting the devolatilized polyester into molding apparatuses.

6. The apparatus of claim 1 comprising means for flowing the collected devolatilized polyester from the flash tank into at least one additional flash tank prior to injecting the devolatilized polyester into the molding apparatus, said means for flowing comprising one or more additional dies at an upper portion of said additional flash tank, which flash tanks each comprise means for maintaining the flash tank under vacuum conditions therein; and means for removing vented gases, vapors and acetaldehyde from the additional flash tank.

7. A method for producing molded polyester articles comprising:

a) reacting polyester precursors and forming a molten polyester homopolymer or copolymer;

b) continuously flowing the molten polyester from step (a) into a mixer, without intermediate solidification of the molten polyester, and forming a mixture of the polyester and an acetaldehyde stripping agent by injecting the acetaldehyde stripping agent into the mixer and mixing the stripping agent with the molten resin under subatmospheric pressure;

c) flowing the mixture, through one or more dies, into an upper portion of a flash tank maintained under vacuum conditions therein, which dies impart a back pressure to the mixer, while removing vented gases, vapors and acetaldehyde from the tank; and d) removing collected devolatilized polyester from the tank and injecting the devolatilized polyester into a molding apparatus to form molded polyester articles.

8. The method of claim 7 wherein an acetaldehyde reducing agent is added prior to step (b) to reduce the amount of acetaldehyde in the polyester prior to forming the mixture with the stripping agent.

9. The method of claim 8 wherein the acetaldehyde reducing agent comprises a polyamide or a polyesteramide.

10. The method of claim 7 wherein an acetaldehyde reducing agent is mixed with the devolatilized polyester after it is removed from the flash tank to further reduce amounts of acetaldehyde prior to molding.

11. The method of claim 10 wherein the acetaldehyde reducing agent comprises a polyamide or a polyesteramide.

12. The method of claim 7 wherein the stripping agent is selected from the group consisting of nitrogen, carbon dioxide, $C_1$ to $C_4$ hydrocarbons, dehumidified air, and noble gases.

13. The method of claim 7 wherein the stripping agent is nitrogen or carbon dioxide.

14. The method of claim 7 wherein the stripping agent is injected into the molten polyester in an amount of about 1.0 SCF per pound of polymer or less.

15. The method of claim 7 comprising continuously flowing the molten polyester from step (a) to a plurality of mixers, without intermediate solidification of the molten polyester, and forming mixtures of the polyester and an acetaldehyde stripping agent by injecting the acetaldehyde stripping agent into the mixers and mixing the stripping agent with the molten resin under superatmospheric pressure;

c) flowing each of the mixtures through one or more dies into upper portions of flash tanks maintained under vacuum conditions therein, which dies impart a back pressure to the mixers, while removing vented gases, vapors and acetaldehyde from the flash tanks; and d) removing collected devolatilized polyester from the flash tanks and injecting the devolatilized polyester into a plurality of molding apparatuses.

16. The method of claim 7 wherein the back pressure from the dies is from about 1000 to about 3000 psi.

17. The method of claim 7 wherein the temperature of the molten polyester ranges from about 255° C. to about 290° C.

18. The method of claim 7 wherein a vacuum in the flash tank ranges from about 5 mm Hg to about 50 mm Hg.

19. The method of claim 7 comprising the step of flowing the collected devolatilized polyester into at least one additional flash tank prior to injecting the devolatilized polyester into the molding apparatus, said flowing being conducted through one or more additional dies, into an upper portion of said additional flash tank which is maintained under vacuum conditions therein, while removing vented gases, vapors and acetaldehyde from the additional flash tank.

20. The method of claim 7 comprising flowing the mixture through a plurality of dies arranged in a manifold configuration.

* * * * *

UNITED STATES PATENT AND TRADEMARK OFFICE
CERTIFICATE OF CORRECTION

PATENT NO : 5,980,797
DATED : November 9, 1999
INVENTOR(S) : Marcus Shelby, et al.

It is certified that error appears in the above-identified patent and that said Letters Patent are hereby corrected as shown below:

Title page, item [54], and column 1, line 5, change
"DEVOLTATILIZATION" to - -DEVOLATILIZATION- -.

Signed and Sealed this

Ninth Day of May, 2000

Attest:

Q. TODD DICKINSON

Attesting Officer

Director of Patents and Trademarks